(12) United States Patent
Eberhard

(10) Patent No.: US 6,639,577 B2
(45) Date of Patent: *Oct. 28, 2003

(54) PORTABLE INFORMATION DISPLAY DEVICE WITH ERGONOMIC BEZEL

(75) Inventor: Martin F. Eberhard, Woodside, CA (US)

(73) Assignee: Gemstar-TV Guide International, Inc., Hollywood, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,095

(22) Filed: May 28, 1998

(65) Prior Publication Data

US 2001/0012000 A1 Aug. 9, 2001

Related U.S. Application Data

(63) Continuation-in-part of application No. 09/034,720, filed on Mar. 4, 1998.

(51) Int. Cl.[7] .................................................. G06F 1/16
(52) U.S. Cl. ........................ 345/102; 345/905; 345/173; 345/901
(58) Field of Search ................................. 345/901, 902, 345/903, 904, 905, 173, 175, 102, 104; 361/681, 682, 683, 679; 341/21–24

(56) References Cited

U.S. PATENT DOCUMENTS

| 4,310,839 A | * | 1/1982 | Schwerdt ..................... 341/22 |
| 4,487,481 A | * | 12/1984 | Suzawa ....................... 345/102 |
| 4,692,809 A | * | 9/1987 | Beining et al. ............. 358/247 |
| 5,177,328 A | * | 1/1993 | Ito et al. ....................... 178/18 |
| 5,265,164 A | | 11/1993 | Matyas et al. |
| 5,455,953 A | | 10/1995 | Russell |
| 5,534,888 A | | 7/1996 | Lebby et al. ................ 345/121 |

(List continued on next page.)

FOREIGN PATENT DOCUMENTS

| DE | 3123596 | | 1/1983 |
| DE | d. 3123596 | * | 5/1983 |
| EP | 0597753 | | 5/1994 |
| EP | 0740244 | | 10/1996 |
| WO | WO 9119245 | | 12/1991 |
| WO | WO 9120072 | | 12/1991 |
| WO | WO 9722107 | | 6/1997 |
| WO | WO 98/08344 | | 2/1998 |
| WO | WO 98/08344 A2 A3 | | 2/1998 |

OTHER PUBLICATIONS

Article entitled: Electrosphere "Ex Libris—The joys of curling up with a good digital reading device"—Wired Jul. 1998.
Silberman, "Ex Libris: The Joys of Curling up with a Good Digital Reading Device.," Wired, pp. 9–14, (Jul. 6, 1998).
Menezes, et al., "Handbook of Applied Cryptography," CRC Press, LLC, pp. 283–284. (1996).

(List continued on next page.)

Primary Examiner—Richard Hjerpe
Assistant Examiner—Kevin M. Nguyen
(74) Attorney, Agent, or Firm—Townsend, Townsend & Crew LLP

(57) ABSTRACT

A portable information display device has a backlit touch-sensitive display screen and a housing. The housing has a bezel portion which defines a perimeter of the display screen. The bezel has location identification means which identify touch-responsive icon regions on the display screen. The location identification means allow the device to be used in poor lighting conditions or by the sight-impaired. The user can trace the bezel until finding the location identification means which corresponds to the desired icon region. The desired icon region can then be touched to manipulate the displayed information.

29 Claims, 4 Drawing Sheets

U.S. PATENT DOCUMENTS

| | | | |
|---|---|---|---|
| 5,560,008 A | | 9/1996 | Johnson et al. |
| 5,598,527 A | * | 1/1997 | Debrus et al. ............... 345/173 |
| 5,663,748 A | | 9/1997 | Huffman et al. ............ 345/173 |
| 5,742,476 A | * | 4/1998 | Miyazaki et al. ........... 361/683 |
| 5,761,306 A | | 6/1998 | Lewis |
| 5,761,485 A | * | 6/1998 | Munyan ..................... 345/500 |
| 5,764,890 A | | 6/1998 | Glasser et al. |
| 5,880,796 A | * | 3/1999 | Sonoda et al. ................ 349/61 |
| 5,883,960 A | | 3/1999 | Maruyama et al. |
| 5,892,899 A | | 4/1999 | Aucsmith et al. |
| 5,896,119 A | * | 4/1999 | Evanicky et al. ............. 345/87 |
| 5,920,310 A | * | 7/1999 | Faggin et al. ............... 345/173 |
| 5,949,408 A | * | 9/1999 | Kang et al. ................. 345/169 |
| 5,956,048 A | * | 9/1999 | Gaston ....................... 345/507 |
| 5,956,406 A | | 9/1999 | Maldy |
| 5,970,147 A | | 10/1999 | Davis |
| 6,005,549 A | * | 12/1999 | Forest ........................ 345/157 |
| 6,011,910 A | | 1/2000 | Chau et al. |
| 6,073,124 A | | 6/2000 | Krishnan et al. |

OTHER PUBLICATIONS

Menezes, et al., "Handbook of Applied Cryptography," CRC Press, LLC, pp. 28–30. (1996).

Silberman, Ex Libris "The joys of curling up with a good digital reading device," *Wired*, pp. 9–14, Jul. 6, 1998.

Menezes, et al., Handbook of Applied Cryptography, 1996 CRC Press, LLC, pp.283–284.

Menezes, et al., Handbook of Applied Cryptography, 1996 CRC Press, LLC, pp. 28–30.

* cited by examiner

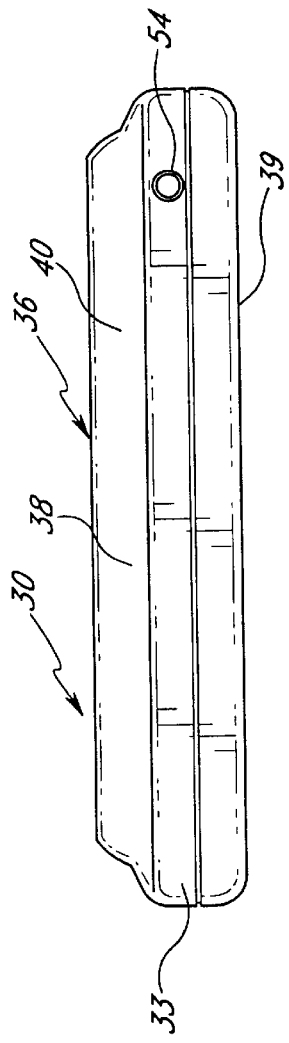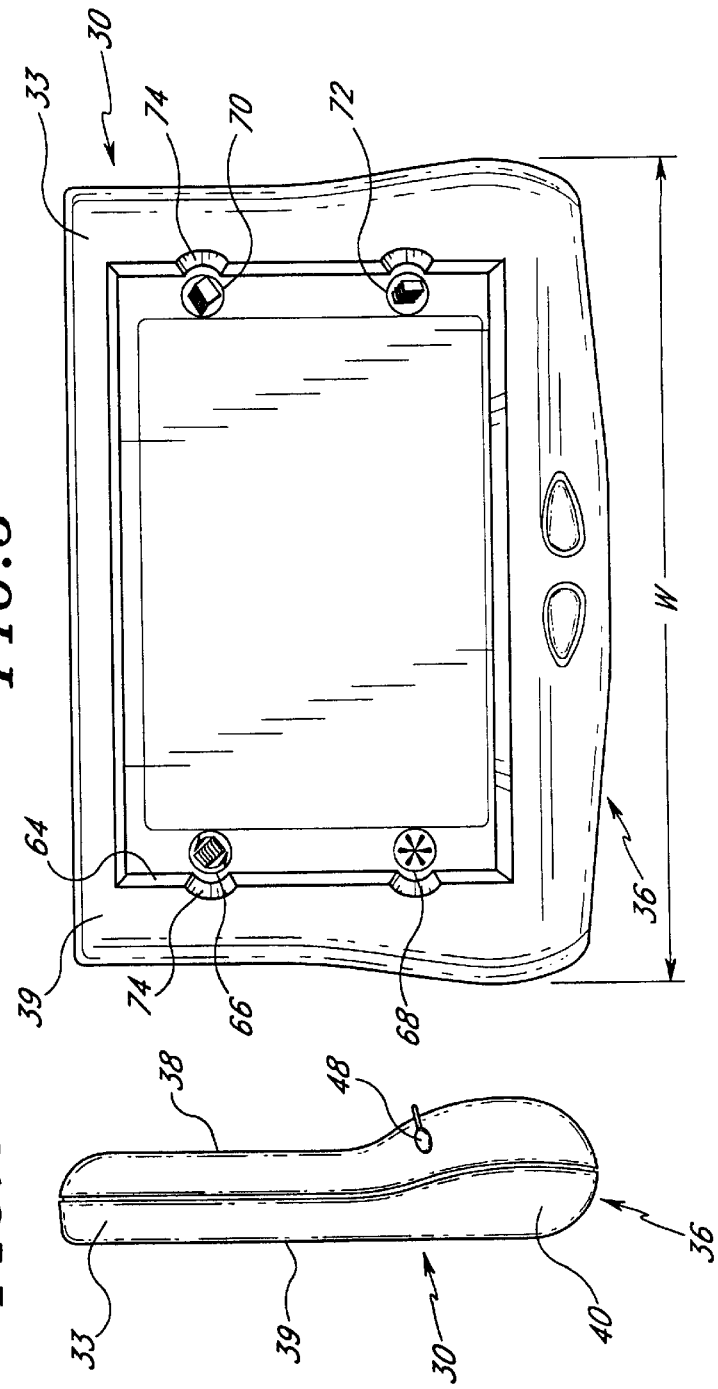

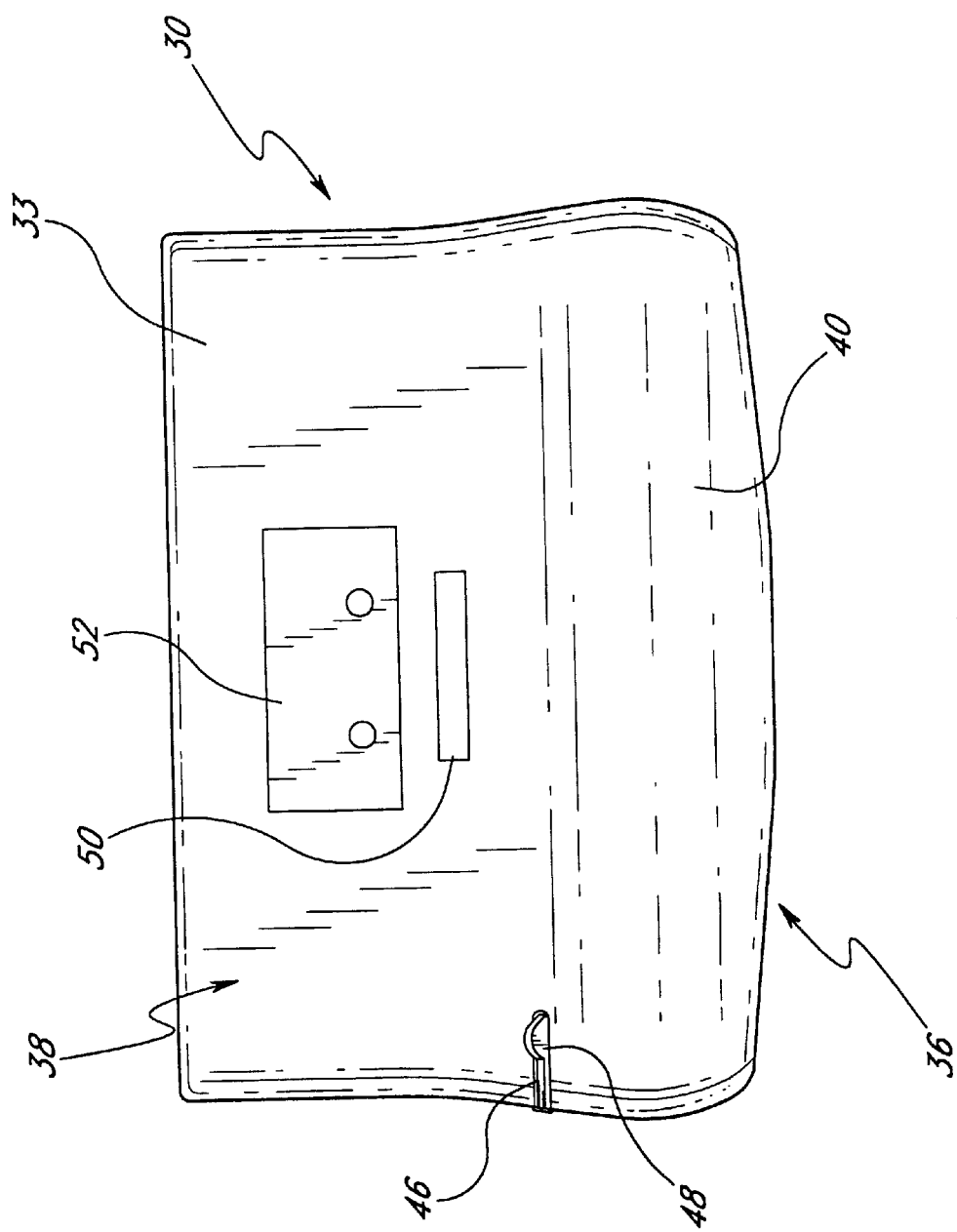

PORTABLE INFORMATION DISPLAY DEVICE WITH ERGONOMIC BEZEL

RELATED APPLICATIONS

This application is a continuation-in-part of U.S. application Ser. No. 09/034,720, filed Mar. 4, 1998.

FIELD OF THE INVENTION

The present invention relates to hand-held computing devices. More particularly, the present invention relates to control-locating aids designed for use with touch-sensitive displays.

BACKGROUND OF THE INVENTION

A variety of hand-held computing devices are available which allow users to view and manipulate informational content using a touch-screen and a stylus. The touch-screen is commonly constructed by superimposing a touch sensitive screen over a back-lit LCD display. The touch sensitive screen is typically larger than the LCD display, and thus provides a touch sensitive area which exceeds the content display area. The excess area is commonly used to display fixed icons that can be touched to bring up menus or activate functions. For example, the PalmPilot device from 3COM includes a fixed "applications" icon (among others) which allows the user bring up a listing of the applications that are available on the device.

One problem with devices of such construction is that the fixed icons are illuminated poorly, if at all, by the back-lit LCD display. As a result, the fixed icons are difficult to see when the device is used in poor lighting conditions. While the use of a larger back-lit LCD display would potentially solve this problem, the use of such a display would significantly increase the manufacturing cost of the device while reducing the available real estate for other device electronics.

SUMMARY OF THE INVENTION

Accordingly, the present invention provides a portable information display device adapted for use in poorly-lit environments. The device has a housing and a touch-sensitive display screen. The housing has an enlarged gripping portion which is adapted to function as an overall directional orientation guide for the device. The display screen has a backlit portion and a non-backlit portion. Touch-responsive regions are defined upon the non-backlit portion. The touch-responsive regions are generally indicated by icons and each touch-responsive region corresponds to a particular function carried out by the device. A perimeter of the display screen is defined by a bezel. The bezel has locator structures, such as notches, which are aligned with the icons and allow users to readily identify the location of the touch-responsive regions of the display screen in poor lighting conditions.

BRIEF DESCRIPTION OF THE DRAWINGS

These and other features, aspects and advantages of the invention will now be described with reference to the drawings of a preferred embodiment which is intended to illustrate and not to limit the invention, and in which:

FIG. 4 is a top plan view of the embodiment of FIG. 1;

FIG. 5 is a left-side elevational view of the embodiment of FIG. 1 which illustrates a stylus storage position;

FIG. 6 is a right-side elevational view of the embodiment of FIG. 1 which illustrates an on-off button; and FIG. 7 is a back side elevational view of the embodiment of FIG. 1 which illustrates the location of the stylus, the battery receptacle and the data-transfer port.

DETAILED DESCRIPTION OF THE PREFERRED EMBODIMENT

Figure 1:
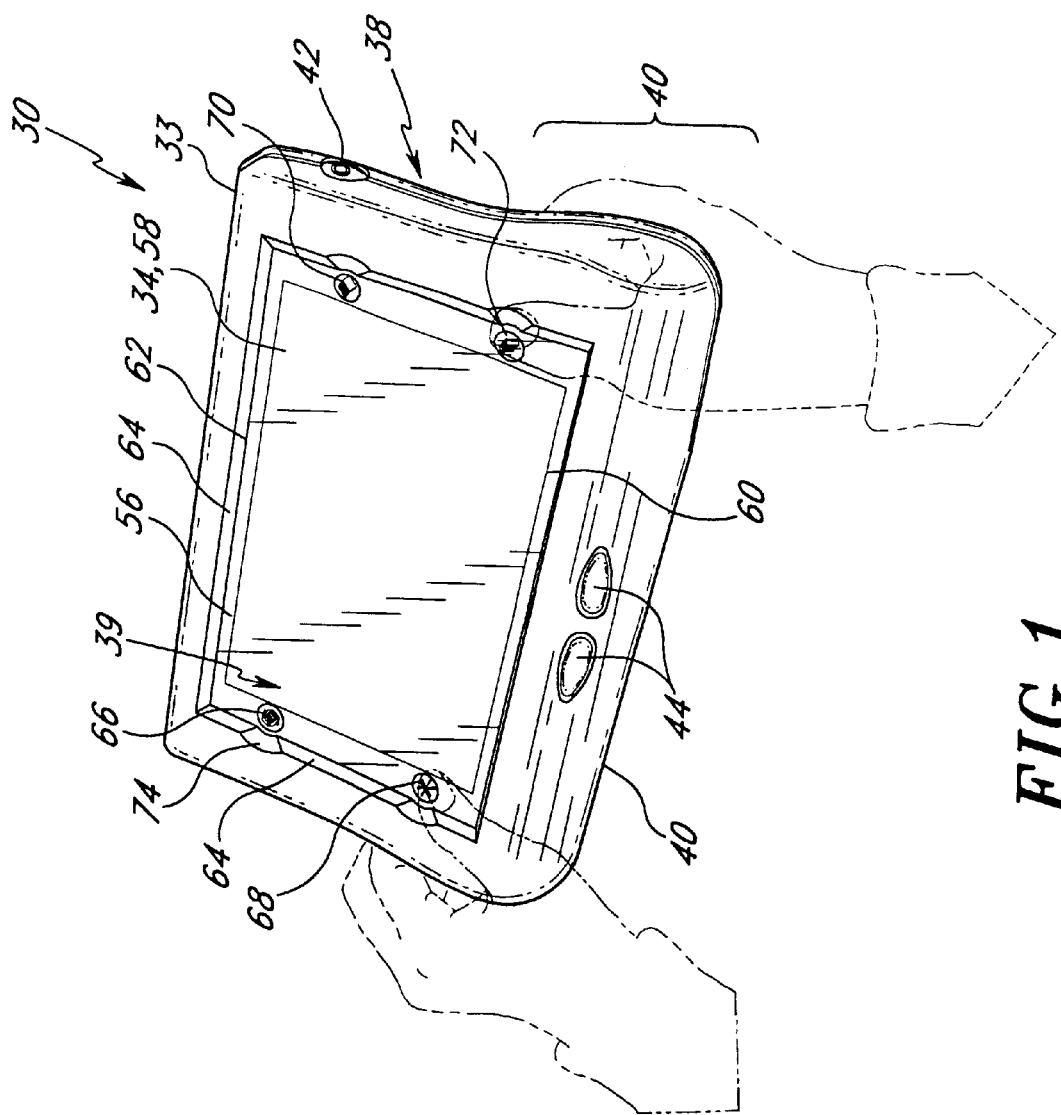
FIG. 1 is a perspective view of an embodiment of a portable information display device being held by a user's hands which are depicted in phantom.
Figure 2:
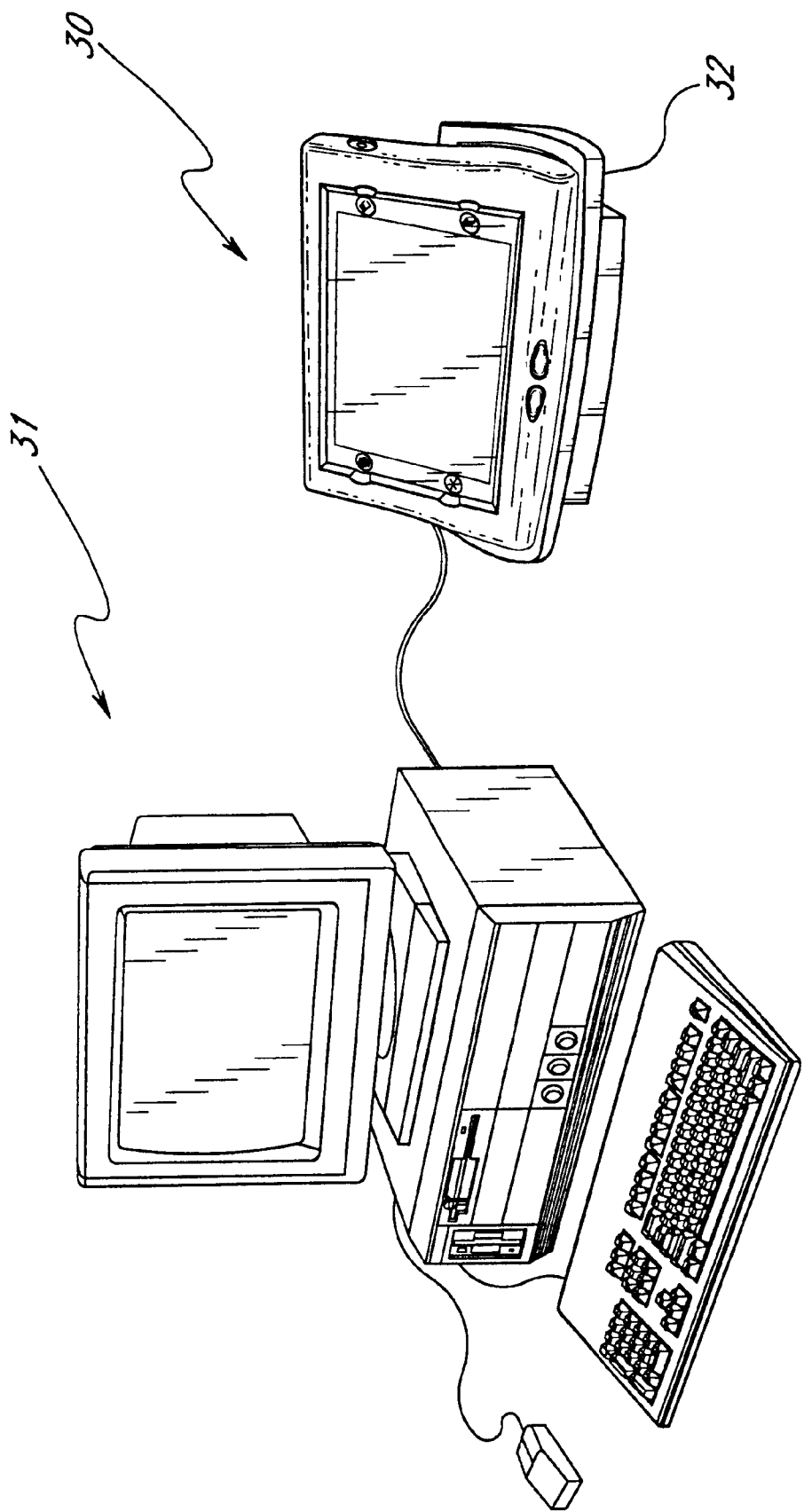
FIG. 2 is a perspective view of the embodiment of FIG. 1 in a receiving cradle which is connected to a personal computer.

FIGS. 1 and 2 illustrate an embodiment of a hand-held device 30 which incorporates various features of the present invention. As will be apparent from the following description, the features of the invention may also be incorporated into other types of hand-held computing devices having touch-sensitive displays. The illustrated device 30 is desirably adapted to be used as a portable reading device. The device 30 allows a user to read titles (books, journal articles, newspapers, etc.) via a touch sensitive display. With reference to FIG. 2, the device 30 receives the titles in digital form from a personal computer (PC) 31 using a docking station or "cradle" 32. In particular, the titles are downloaded from the PC 31 to the device 30 via the cradle 32. To enable the download, the cradle 32 and the PC 31 are in electrical communication or otherwise connected for data transfer. Using the device's user interface features, a user an perform a plurality of tasks such as, but not limited to, selecting titles to view, adjusting the font size and orientation of the displayed text, deleting titles from memory, and attaching notes and bookmarks to the displayed text. Further details regarding the user interface are contained in copending application entitled Citation Selection and Routing Feature for Hand-Held Content Display Device. Application Ser. No. 09/086,249, U.S. Pat. No. 6,356,287, filed on the same date as the present application, the disclosure of which is hereby incorporated by reference in its entirety.

Figure 3:
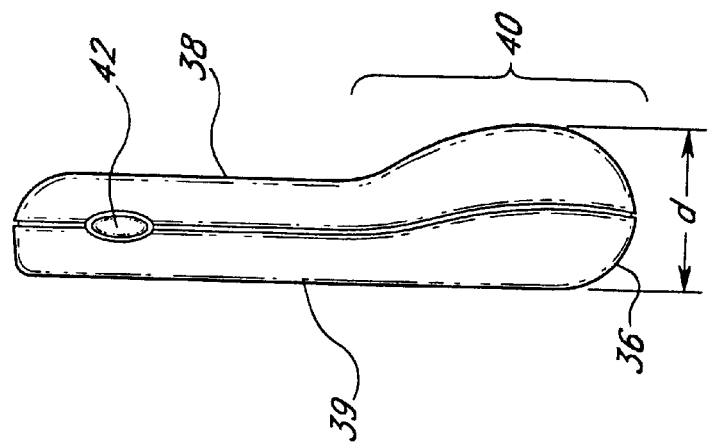
FIG. 3 is a front side elevational view of the embodiment of FIG. 1.

With reference to FIGS. 1 and 3–7, the reader device 30 has a housing 33 which, in part, forms an enclosure. The housing 33 substantially encases a display screen 34. As illustrated in FIGS. 1, 3 and 4, the lower portion of the housing 33 advantageously has an increased width, w, and depth, d, resulting in a rounded configuration along its base 36. The rounded configuration forms an extended gripping area 40 for holding the device.

The gripping portion 40 is desirably sized and shaped to correspond generally to a typical user's hand as illustrated in FIG. 1. Moreover, the gripping portion 40 includes a curved portion which extends primarily along a back side 38 of the device to accommodate the user's fingers. As will be recognized by one of skill in the art, the gripping portion 40 can also have individual indentations defining desirable finger locations, a rubberized or textured surface, or other known user comfort features. In addition, the front side 39 of the device can be curved to accommodate the user's fingers.

The gripping portion 40 houses one or more elongated, rechargeable batteries (not shown) that are used to power the device 30. Accordingly, the gripping portion 40 is heavily weighted in comparison to the balance of the device 30. The batteries are enclosed within the illustrated device; however, as will be recognized by those of skill in the art, a convenient battery compartment and door can be provided for easily-removable batteries. An important advantage of the device configuration and weight distribution is that it reduces stress on the user's hands and wrists during prolonged reading sessions. This feature, combined with the ability to change the display orientation enables the user to find and maintain a comfortable reading position.

With reference to FIG. 1, a power button 42 is located along one of the ends of the housing 33. The front face 39 of the housing 33 also contains apertures for scroll buttons 44. The scroll buttons 44 advantageously control movement of information on the screen such as, for example, up and down movement of a full page of scrollable text. The scroll buttons 44 are designed for manipulation by the user's thumbs. Accordingly, the location of the scroll buttons 44 desirably correspond to the location of the gripping portion 40 because the gripping portion 40 defines the typical location of the user's hands. As will be recognized by one of skill in the art, the location of the scroll buttons 44 depends, in part, upon the location and orientation of the user's hands. Accordingly, many variations on the location are envisioned such as, but not limited to, close together on the base portion 36, spread apart on the base portion 36, or on the front face 39 of the device along the sides of the screen 34.

The back side 38 of the housing 33, shown in FIG. 7, has an opening 46 formed therein for holding a stylus 48. Once removed, the stylus 48 can be used to contact the touch-screen display 34 with greater precision than a human finger. The back side 38 of the housing 33 also has a multi-pin connector 50 for connection to the cradle 32. The multi-pin connector 50 of the illustrated embodiment both provides the hardware for data transfer and also provides a power source for recharging the batteries of the device. The device 30 also includes an audio speaker 52 for outputting digital audio signals, and includes an infrared (IrDA) transceiver 54 (FIG. 5) for communicating with the PC or another hand-held device. The audio speaker 52 and the infrared transceiver 54 can be arranged anywhere within the housing 33 of the device 30. In the illustrated embodiment, the speaker 52 is arranged along the back 38 of the housing 33. The infrared transceiver 54, however, is located on the top of the device, as shown in FIG. 5.

With reference to FIG. 1, the device's touch-sensitive display 34 includes a touch screen 56 which is mounted on top of a LCD display 58 (the perimeter of which is denoted by 60). The touch screen 56 forms a touch-sensitive portion of the display 34. The LCD display 58 desirably is equipped with a backlight which can be turned on and off using the power button 42. In particular, the user's first contact with the power button 42 turns on the device 33 and the backlight. Each subsequent contact toggles the backlight on and off. To turn the device 33 off, the user presses and holds the power button 42 for a predetermined period, such as, but without limitation, one second. The perimeter 60 of the touch screen 56 is defined by an inward-facing edge 62 of a bezel 64 of the housing 33. As will be recognized by one of skill in the art, the touch screen 56 may extend to an area larger than that defined by the bezel 64 by extending underneath the bezel 64 of the housing 33. In one implementation, the touch screen 56 is a Panasonic EMU-601A2N400 device.

As best seen in FIG. 4, the portion of the touch screen 56 which extends beyond the perimeter 60 of the LCD display 58 has four fixed icons displayed thereon. The icons identify a function control region or an icon region. Each icon has a function associated with it to form four respective function keys: an orientation key 66, a user-definable "hotkey" 68, a book menu key 70, and a library menu key 72. As will be recognized by those of skill in the art, the number and definitions of the icons can be varied according to the application or device. The icons may be permanent or electronically displayed. Moreover, the icons can be painted or inked directly onto the glass of the display, can be etched into the glass, can be adhered to the glass, can be in the form of stickers or decals, or can be otherwise displayed permanently on the glass. The icons can also be displayed only when the device is on, or in another sleep-mode configuration. In another embodiment, the icons can be mode-dependent icons which change in appearance and function as a result of user actions. As will be recognized by those of skill in the art, the icon regions can also be indicated by any other suitable means.

When the orientation key 66 is touched, the device displays a menu (not shown) which enables the user to select one of four possible orientations for displaying the text or other informational content on the touch sensitive display 34. The orientation of the text is defined with reference to an edge of the screen display. When the user touches the hotkey 68, the device 30 performs a function (the "hotkey function") that is currently assigned to the hotkey 68. In other words, the hotkey 68 can be assigned to any menu function to allow one touch access to that function. For example, but without limitation, a bookmark may be set, retrieved or both using the hotkey 68 which will allow a user to quickly relocate their previous location.

When the user presses the book menu key 70 or the library menu key 72, the device 30 displays a book menu or a library menu, respectively. Through these menus, the user can, for example but without limitation, select information to be displayed, edit the displayed information, or otherwise access a plethora of system options. The book menu includes various menu items which pertain generally to the title that is currently being viewed. The library menu contains menu items which pertain generally to the library of titles that are currently stored within the device. Additional details regarding the menus are contained in the above-referenced concurrently-filed application.

As discussed above, the bezel 64 defines a perimeter of the touch-sensitive screen 56. The icons are advantageously arranged along the perimeter of the touch-sensitive screen 56 adjacent to the bezel 64. The icons, as described above, represent touch-sensitive regions which control various functions of the device 30. Because the backlit portion of the display screen, the LCD screen, does not extend to the touch-responsive regions of the display screen identified by the icons, the icons are difficult to locate in low-light conditions. Accordingly, the touch-sensitive regions represented by the icons can be located using locator structures 74 provided on the device. The locator structures thereby reduce the area which must necessarily be backlit in order to use the device in low-light conditions and, accordingly, reduce the power drain caused by the backlighting.

With reference to FIG. 4, the locator structures 74 of the illustrated embodiment are truncated conical recesses which are arranged adjacent to the control regions of the screen. As will be apparent to those of ordinary skill in the art, the locator structures 74 can be either recessed surfaces or elevated surfaces arranged along the bezel 64 or front face of the device 33. Moreover, the specific ornamental geometry of the locator structures 74 may be of various shapes. For example, but without limitation, the locator structures 74 can be wedge-shaped recesses, cylindrical-shaped recesses, cube-shaped recesses, wedge-shaped ridges, cylindrical-shaped ridges, or cube-shaped ridges. Preferably, the locator structures are finger sized to facilitate use of the device by the user's fingers. Moreover, the locator structures are desirably tapered in that the size of the notch progressively decreases as the user's finger or stylus approaches the screen. The enlarged ends of the notches exaggerate the locations on the bezel which correspond to the control regions on the screen while tapering to reduce the actual real estate required by each control region on the display screen. Moreover, the tapered locator structures 74 enable a user to easily identify the location of the control regions without actually contacting the screen. Advantageously, the control regions extend into the notches so that the user can place a finger or stylus within the notch to contact the control region of the display screen. While the illustrated embodiment utilizes four icons and four corresponding locator structures, one of skill in the art will also recognize that fewer or more locator structures and icons can also be used.

The illustrated embodiment of the present invention enables a user to access, manipulate and review information while the user is exposed to poor lighting conditions, including when the user is in the dark. Moreover, the features of the present invention enable a sight-impaired user to use the device as an automated reader. In particular, the elongated gripping portion 40 facilitates an initial orientation of the device relative to the user's body. The power button 42 is easily identified along a side of the housing 33 for ease in powering the device 30. The text can then be manipulated to orient the flow of the text to the orientation of the device selected by the user. The location of the scroll buttons 44 eases the user's manipulation of the displayed information. Moreover, the backlit display allows the displayed information to be read even under dark conditions. The icons which control the manipulation of the information are readily located through the inventive locator structures 74 arranged adjacent to the touch-responsive icon regions of the touch-sensitive display screen 34. The user can trace the outline of the screen identified by the bezel until the locator structures 74 are found. Upon finding the locator structure which corresponds to the desired icon region, the user may then contact the icon to perform the desired manipulation of the displayed information.

Although this invention has been described in terms of certain preferred embodiments, other embodiments that are apparent to those or ordinary skill in the art are also within the scope of this invention. Accordingly, the scope of the present invention is intended to be defined only by reference to the appended claims.

What is claimed is:

1. A portable reading device for displaying an electronic book title, the portable reading device comprising a display screen and an enclosure, the display screen comprising a backlit portion and non-backlit portion, wherein the backlit portion is arranged substantially in a center portion of the display screen and configured to display the electronic book title and the non-backlit portion is arranged substantially in a periphery portion of the display screen, the display screen having a touch-sensitive portion defined upon the non-backlit portion with a touch responsive icon arranged thereon, the touch responsive icon having a function associated with it which is performed by the device when the icon is touched, the enclosure having a bezel with defines a perimeter of the display screen, the bezel having a position identification means, the position identification means aligned with the touch responsive icon to allow a user to identify the location of a touch responsive icon region on the display screen in low-light conditions.

2. The portable reading device of claim 1 wherein the position identification means comprises a recessed surface.

3. The portable reading device of claim 1 wherein the position identification means comprises an elevated surface.

4. The portable reading device of claim 1 wherein the position identification means is finger-sized.

5. A portable reading device for displaying an electronic book title, the portable reading device comprising a touch sensitive screen and a housing, the touch sensitive screen comprising a backlit portion and non-backlit portion, wherein the backlit portion is arranged substantially in a center portion of the display screen and configured to display the electronic book title and the non-backlit portion is arranged substantially in a periphery portion of the display screen, and having an icon displayed on the non-backlit portion, the icon representing a function that is performed by the device when a corresponding portion of the screen is touched, the housing having a bezel which surrounds the exterior portion of the touch sensitive screen, an inward facing edge of the bezel having a recess formed therein to assist a user of the device in locating the icon when the device is used in low-light conditions, the recess positioned adjacent to the icon.

6. The portable information display device of claim 5 wherein the icon is an electronically displayed icon.

7. The portable reading device of claim 6 wherein the electronically displayed icon is a mode-dependent icon which changes in function and appearance in response to changes in a mode of the device.

8. The portable reading device of claim 5 wherein the housing is configured to engage a docking station which connects to a personal computer.

9. A portable reading device for displaying an electronic book title, the portable reading device comprising a display screen and an enclosure surrounding the display screen, the display screen comprising a backlit portion and non-backlit portion, wherein the backlit portion is arranged substantially in a center portion of the display screen and configured to display the electronic book title and the non-backlit portion is arranged substantially in a periphery portion of the display screen, the display screen having at least a portion adapted to provide a touch sensitive display surface, the touch sensitive display surface defined upon the non-backlit portion, an enclosure surrounding the display screen, the enclosure having a bezel surface extending to the display screen, the bezel having a recess positioned adjacent to the display screen, and the recess being aligned with a function control region.

10. The portable reading device of claim 9 wherein the function control region is identified by an icon which forms a fixed portion of the display screen.

11. The portable reading device of claim 10 wherein the icon is arranged to be permanently displayed on the screen.

12. The portable reading device of claim 9 wherein the icons control manipulations of displayed information.

13. The portable reading device of claim 9 further comprising a power button, wherein the power button activates a backlight for the screen.

14. The portable reading device of claim 9 wherein the icon activates a user-defined function.

15. The portable reading device of claim 9 wherein the icon controls a screen orientation of the displayed information.

16. The portable reading device of claim 9 wherein the icon facilitates selection of the displayed information.

17. The portable reading device of claim 9 wherein the icon facilitates editing of the displayed information.

18. The portable reading device of claim 9 wherein the icon facilitates access to menus of system options.

19. A portable reading device for displaying an electronic book title, the portable reading device comprising a display screen and an enclosure surrounding the display screen, the display screen comprising a backlit portion and non-backlit portion, wherein the backlit portion is arranged substantially in a center portion of the display screen and configured to display the electronic book title and the non-backlit portion is arranged substantially in a periphery portion of the display screen, the display screen having a touch sensitive portion defined upon the non-backlit portion, the enclosure having a bezel surface extending to the display screen, the bezel surface forming a ring around said display screen and having a recess positioned proximate the touch sensitive portion of the display screen, the recess being tapered from the enclosure to the display screen, the recess also comprising a cavity extending into the bezel surface at a juncture between the bezel surface and the display screen with the touch sensitive portion of the display screen extending into the cavity such that the touch sensitive portion of the display screen can be contacted within the cavity.

20. The device of claim 19 further comprising an icon at least partially positioned within the cavity.

21. The device of claim 20, wherein the recess is sized and configured to accept an average size finger.

22. The device of claim 21, wherein the cavity allows the finger to contact the portion of the icon disposed within the cavity.

23. The device of claim 20, wherein the recess is sized and configured to accept a stylus.

24. The device of claim 23, wherein the cavity allows the stylus to contact the portion of the icon disposed within the cavity.

25. A portable reading device for displaying an electronic book title, the portable reading device comprising an enclosure, the enclosure having a front surface, a back surface and at least one side surface extending between the front surface and the back surface, a display screen being mounted within the enclosure, a bezel extending between the enclosure and the display screen, the bezel having an outer edge and an inner edge with the outer edge defining a juncture between the bezel and the enclosure and the inner edge defining a juncture between the bezel and the display screen, at least one recess being formed at least partially in the bezel and extending from the enclosure to the display screen, the at least one recess being tapered in the direction of the display screen such that an enclosure end is larger than a display end, the display end of the at least one recess forming a concavity within the inner edge of the bezel, the display screen comprising a backlit portion and non-backlit portion, wherein the backlit portion is arranged substantially in a center portion of the display screen and configured to display the electronic book title and the non-backlit portion is arranged substantially in a periphery portion of the display screen, the display screen including a touch sensitive portion defined upon the non-backlit portion and positioned proximate the concavity, and an icon representing a function that is performed by the device being positioned at least partially within the concavity such that the icon can be easily contacted by a finger or a stylus positioned within the recess when the device is used in low-light conditions.

26. The device of claim 25, wherein the device further comprises a receptacle for a stylus.

27. The device of claim 26, wherein the receptacle is positioned along the side surface.

28. The device of claim 27, wherein the receptacle includes a slot that extends along a portion of the back surface.

29. The device of claim 25, wherein a power button is disposed along the side surface.

* * * * *